US008914736B2

(12) United States Patent
Cardasco

(10) Patent No.: US 8,914,736 B2
(45) Date of Patent: Dec. 16, 2014

(54) ON-PAGE MANIPULATION AND REAL-TIME REPLACEMENT OF CONTENT

(75) Inventor: Matthew Cardasco, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/401,725

(22) Filed: Feb. 21, 2012

(65) Prior Publication Data

US 2012/0151329 A1    Jun. 14, 2012

Related U.S. Application Data

(63) Continuation-in-part of application No. 12/750,607, filed on Mar. 30, 2010.

(60) Provisional application No. 61/445,528, filed on Feb. 22, 2011.

(51) Int. Cl.
| | |
|---|---|
| G06F 3/00 | (2006.01) |
| G06F 11/32 | (2006.01) |
| G06Q 30/02 | (2012.01) |
| G06F 17/30 | (2006.01) |
| G06F 11/30 | (2006.01) |
| H04L 29/08 | (2006.01) |
| G06F 11/34 | (2006.01) |

(52) U.S. Cl.
CPC .......... *G06F 11/3006* (2013.01); *G06F 11/328* (2013.01); *G06Q 30/02* (2013.01); *G06F 2201/875* (2013.01); *G06F 11/3438* (2013.01); *G06F 2201/86* (2013.01); *G06F 17/3089* (2013.01); *G06F 11/3495* (2013.01); *H04L 67/36* (2013.01)
USPC ............................ 715/760; 715/234; 715/744

(58) Field of Classification Search
USPC ........................................ 715/234, 760, 744
See application file for complete search history.

(56) References Cited

U.S. PATENT DOCUMENTS

| | | | |
|---|---|---|---|
| 5,463,547 | A | 10/1995 | Markowitz |
| 5,564,043 | A | 10/1996 | Siefert |

(Continued)

FOREIGN PATENT DOCUMENTS

| | | |
|---|---|---|
| CA | 2656539 | 2/2008 |
| CA | 2696884 | 3/2009 |

(Continued)

OTHER PUBLICATIONS

Reed Martin; Using Google Analytics Site Overlay; Community Spark; Apr. 13, 2007. Online: <http://www.communityspark.com/using-google-analytics-site-overlay/>.

(Continued)

*Primary Examiner* — Doon Chow
*Assistant Examiner* — Tam Tran
(74) *Attorney, Agent, or Firm* — Stolowitz Ford Cowger LLP

(57) ABSTRACT

A request to render a control content is intercepted by a client application as it is being served from a content source. Based on predetermined criteria, the control content is replaced with replacement content. The replacement content may be an alternative version of the control content differing from the control content in one or more alternative elements. The replacement content may be created with a graphical interface that overlays the control content. The graphical interface allows a user to select elements of the control content, edit the selected elements of the control content, and save the edited elements as part of the replacement content.

16 Claims, 13 Drawing Sheets

(56) References Cited

U.S. PATENT DOCUMENTS

| | | |
|---|---|---|
| 5,577,254 A | 11/1996 | Gilbert |
| 5,699,526 A | 12/1997 | Siefert |
| 5,715,314 A | 2/1998 | Payne |
| 5,717,879 A | 2/1998 | Moran et al. |
| 5,721,906 A | 2/1998 | Siefert |
| 5,751,962 A | 5/1998 | Fanshier et al. |
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand et al. |
| 5,845,124 A | 12/1998 | Berman |
| 5,848,396 A | 12/1998 | Gerace |
| 5,848,412 A | 12/1998 | Rowland |
| 5,857,188 A | 1/1999 | Douglas |
| 5,867,578 A | 2/1999 | Brickell |
| 5,870,559 A | 2/1999 | Leshem et al. |
| 5,894,516 A | 4/1999 | Brandenburg |
| 5,903,652 A | 5/1999 | Mital |
| 5,905,868 A | 5/1999 | Baghai et al. |
| 5,909,492 A | 6/1999 | Payne |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papierniak et al. |
| 6,151,601 A | 11/2000 | Papierniak et al. |
| 6,169,997 B1 | 1/2001 | Papierniak et al. |
| 6,182,097 B1 | 1/2001 | Hansen et al. |
| 6,253,203 B1 | 6/2001 | O'Flaherty et al. |
| 6,286,030 B1 | 9/2001 | Wenig |
| 6,286,046 B1 | 9/2001 | Bryant |
| 6,286,098 B1 | 9/2001 | Wenig |
| 6,295,550 B1 | 9/2001 | Choung et al. |
| 6,317,794 B1 | 11/2001 | Papierniak et al. |
| 6,334,110 B1 | 12/2001 | Walter et al. |
| 6,397,256 B1 | 5/2002 | Chan |
| 6,418,439 B1 | 7/2002 | Papierniak et al. |
| 6,480,855 B1 | 11/2002 | Siefert |
| 6,489,980 B1 | 12/2002 | Scott et al. |
| 6,502,096 B1 | 12/2002 | Siefert |
| 6,519,600 B1 | 2/2003 | Siefert |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papierniak et al. |
| 6,766,333 B1 | 7/2004 | Wu et al. |
| 6,850,975 B1 | 2/2005 | Danneels et al. |
| 6,877,007 B1 | 4/2005 | Hentzel et al. |
| 7,076,495 B2 | 7/2006 | Dutta et al. |
| 7,260,837 B2 | 8/2007 | Abraham |
| 7,272,639 B1 | 9/2007 | Levergood |
| 7,278,105 B1 | 10/2007 | Kitts |
| 7,293,281 B1 | 11/2007 | Moran et al. |
| 7,490,319 B2 | 2/2009 | Blackwell et al. |
| 7,580,996 B1 | 8/2009 | Allan |
| RE41,903 E | 10/2010 | Wenig |
| 8,042,055 B2 | 10/2011 | Wenig |
| 8,127,000 B2 | 2/2012 | Wenig |
| 8,219,531 B2 | 7/2012 | Eagan et al. |
| 8,335,848 B2 | 12/2012 | Wenig |
| 8,381,088 B2 | 2/2013 | Kikin-Gil et al. |
| 8,533,532 B2 | 9/2013 | Wenig |
| 8,583,772 B2 | 11/2013 | Wenig |
| 2002/0049840 A1 | 4/2002 | Squire |
| 2002/0056091 A1 | 5/2002 | Bala |
| 2002/0065912 A1 | 5/2002 | Catchpole et al. |
| 2002/0070953 A1 | 6/2002 | Barg et al. |
| 2002/0083183 A1 | 6/2002 | Pujare et al. |
| 2002/0112035 A1 | 8/2002 | Carey |
| 2002/0165954 A1 | 11/2002 | Eshghi et al. |
| 2003/0005000 A1 | 1/2003 | Landsman |
| 2003/0023715 A1 | 1/2003 | Reiner et al. |
| 2003/0128233 A1 | 7/2003 | Kasriel |
| 2003/0145071 A1 | 7/2003 | Straut |
| 2003/0154289 A1 | 8/2003 | Williamson et al. |
| 2004/0019675 A1 | 1/2004 | Hebeler |
| 2004/0059809 A1 | 3/2004 | Benedikt et al. |
| 2004/0059997 A1* | 3/2004 | Allen et al. ............... 715/501.1 |
| 2004/0078464 A1 | 4/2004 | Rajan |
| 2004/0100507 A1 | 5/2004 | Hayner et al. |
| 2004/0158574 A1 | 8/2004 | Tom et al. |
| 2005/0021713 A1 | 1/2005 | Dugan et al. |
| 2005/0030966 A1 | 2/2005 | Cai et al. |
| 2005/0033803 A1 | 2/2005 | Vleet et al. |
| 2005/0066037 A1 | 3/2005 | Song et al. |
| 2005/0071464 A1 | 3/2005 | Kuwata et al. |
| 2005/0086606 A1 | 4/2005 | Blennerhassett et al. |
| 2005/0188080 A1 | 8/2005 | Motsinger et al. |
| 2005/0246651 A1 | 11/2005 | Krzanowski |
| 2005/0278565 A1 | 12/2005 | Frattura et al. |
| 2006/0048214 A1 | 3/2006 | Pennington et al. |
| 2006/0075088 A1 | 4/2006 | Guo |
| 2006/0117055 A1 | 6/2006 | Doyle |
| 2006/0123340 A1 | 6/2006 | Bailey et al. |
| 2006/0162071 A1* | 7/2006 | Dixon et al. ............... 5/93.1 |
| 2007/0106692 A1 | 5/2007 | Klein |
| 2007/0226314 A1 | 9/2007 | Eick |
| 2007/0245249 A1 | 10/2007 | Weisberg |
| 2007/0255754 A1 | 11/2007 | Gheel |
| 2008/0005661 A1* | 1/2008 | Yao et al. ............... 715/513 |
| 2008/0005793 A1 | 1/2008 | Wenig et al. |
| 2008/0034036 A1 | 2/2008 | Takeshima et al. |
| 2008/0046562 A1 | 2/2008 | Butler |
| 2008/0052377 A1 | 2/2008 | Light |
| 2008/0127217 A1 | 5/2008 | Wang |
| 2008/0184129 A1 | 7/2008 | Cancel et al. |
| 2008/0216094 A1 | 9/2008 | Anderson |
| 2008/0294974 A1 | 11/2008 | Nurmi et al. |
| 2009/0013347 A1 | 1/2009 | Ahanger |
| 2009/0019133 A1 | 1/2009 | Brimley |
| 2009/0024930 A1* | 1/2009 | Kim ............... 715/744 |
| 2009/0037517 A1 | 2/2009 | Frei |
| 2009/0037914 A1 | 2/2009 | Chagoly et al. |
| 2009/0063968 A1 | 3/2009 | Wenig |
| 2009/0070869 A1 | 3/2009 | Fan et al. |
| 2009/0083714 A1 | 3/2009 | Kiciman et al. |
| 2009/0138554 A1 | 5/2009 | Longobard et al. |
| 2009/0228474 A1 | 9/2009 | Chiu et al. |
| 2009/0247193 A1 | 10/2009 | Kalavade |
| 2009/0254529 A1 | 10/2009 | Goldentouch |
| 2010/0042573 A1 | 2/2010 | Wenig |
| 2010/0058285 A1 | 3/2010 | Meijer |
| 2010/0070929 A1 | 3/2010 | Behl et al. |
| 2010/0146380 A1 | 6/2010 | Rousso |
| 2010/0211638 A1 | 8/2010 | Rougier |
| 2010/0251128 A1 | 9/2010 | Cordasco |
| 2010/0287229 A1 | 11/2010 | Hauser |
| 2010/0318507 A1* | 12/2010 | Grant et al. ............... 707/706 |
| 2011/0029665 A1 | 2/2011 | Wenig et al. |
| 2011/0320880 A1 | 12/2011 | Wenig |
| 2012/0084437 A1 | 4/2012 | Wenig |
| 2012/0102101 A1 | 4/2012 | Wenig |
| 2012/0173966 A1 | 7/2012 | Powell |
| 2013/0091417 A1 | 4/2013 | Cordasco |
| 2013/0339428 A1 | 12/2013 | Wenig |
| 2014/0115712 A1 | 4/2014 | Powell |
| 2014/0137052 A1 | 5/2014 | Hernandez |
| 2014/0143652 A1 | 5/2014 | DeLoach |

FOREIGN PATENT DOCUMENTS

| | | |
|---|---|---|
| EP | 0326283 | 8/1989 |
| EP | 0843449 | 5/1998 |
| EP | 1097428 | 6/2002 |
| EP | 07840244.3 | 2/2008 |

(56) References Cited

FOREIGN PATENT DOCUMENTS

| EP | 08769998.9 | 3/2009 |
|---|---|---|
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

Smith et al., "Automated Protocol Analysis," Human Computer Interaction, 8:101-145, 1993.
Bishop, Matt et al., "A Model of Security Monitoring", Department of Mathematics and Computer Science, Dartmouth College, pp. 46-52.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999, pp. 337-355.
International Search Report for PCT/US08/65582; Date of Mailing Sep. 11, 2008.
International Search Report for PCT/US2007/071096; Date of mailing May 13, 2008.
Written Opinion of the International Searching Authority for PCT/US08/65582; Mailing date Sep. 11, 2008.
Written Opinion of the International Searching Authority for PCT/US07/71096; Mailing date May 13, 2008.
PCT Search Report for PCT/US2011/033813; Mailing Date Jul. 28, 2011.
Written Opinion of the International Searching Authority for PCT/US2011/033813; Mailing Date Jul. 28, 2011.
Stolowitz Ford Cowger Listing of Related Cases Mar. 15, 2012.
International Search Report for PCT/US09/04654; Date of mailing Oct. 2, 2009.
Written Opinion of the International Searching Authority; PCT/US09/04654; Date of mailing Oct. 2, 2009.
Holloway, et al., "Cryptographic Initialization Test", IBM Technical Dsiclsoure Bulletin, pp. 195-198, Feb. 1991.

Peter Brusilovsky et. al., "Adaptive and Intelligent Web-based Educational Systems," International Journal of Artificial Intelligence in Education, Apr. 1, 2003, pp. 159-172, XP55039152, The Netherlands Retrieved from the Internet: URL: http://www.sis.pitt.edu/~peterb/papers/AIWBES.pdf [retrieved on Sep. 25, 2012] p. 160-161.
Atterer R et al. : "Knowing the User's Every Move—User Activity Tracking for Website Usability Evaluation and Implicit Interaction," WWW '06 Procedings of the 15th World Wide Web, ACM, New York, NY, USA, May 22, 2006, pp. 203-212, XP002519605, DOI: 10.1145/1135777.1135811 ISBN 978-1-5959-323-2.
Bishop, Matt et al., "A Model of Security Monitoring", Department of Mathematics and Computer Science, Dartmouth College, pp. 46-52, Dec. 1989.
International Search Report for PCT/US2013/023636; Date of Mailing Aug. 13, 2013.
Written Opinion of the International Searching Authority for PCT/US2013/023636; Date of Mailing Aug. 13, 2013.
Communication from the EP Patent Office pursuant to Article 94(3) EPC in EP Application No. 09806979.2; dated Jan. 6, 2014.
Rubio, An Introduction to JSON, Feb. 28, 2007, http://www.oracle.com/technetwork/articles/entarch/introduction-json-097942.html.
Teare, An Introduction to Ajax, Aug. 2005, http://www.oracle.com/technetwork/articles/entarch/ajax-introduction-096831.html.
Stolowitz Ford Cowger LLP; Listing of Related Cases; Dec. 19, 2013.
Summons to attend oral proceedings pursuant to Rule 115(1) in EP App. No. 07840244.3; Dated Dec. 12, 2013.
Stolowitz Ford Cowger LLP, Listing of Related Cases May 3, 2012.
Written Opinion of the International Searching Authority; PCT/US11/35410; Date of mailing Dec. 14, 2011.
International Search Report for PCT/US11/35410; Date of mailing Dec. 14, 2011.
Han et al., "Using Ajax for Desktop—;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.
Lubarsky, How to Delete Cookie Using Javascript, Aug. 19, 2007, http:web.archive.org/web/20070819123555/http://blogs.x2line.com/al/articles/316.aspx.
Stolowitz Ford Cowger LLP; Listing of Related Cases; Aug. 27, 2012.
International Search Report for PCT/US12/25971; Date of mailing May 31, 2012.
Written Opinion of the International Searching Authority for PCT/US12/25971; Date of mailing May 31, 2012.

* cited by examiner

ON-PAGE MANIPULATION AND REAL-TIME REPLACEMENT OF CONTENT

The present application claims priority to U.S. Provisional Patent Application, Ser. No. 61/445,528, entitled: USING RICH INTERNET APPLICATIONS FOR ON-PAGE MANIPULATION OF UNDERLYING CONTENT AND REAL-TIME CONTENT REPLACEMENT, filed Feb. 22, 2011, which is incorporated by reference in its entirety. The present application is also a continuation-in-part of co-pending U.S. patent application Ser. No. 12/750,607, entitled: VISUALIZATION OF WEBSITE ANALYTICS, filed Mar. 30, 2010, which is incorporated by reference in its entirety.

FIELD

This application relates generally to data processing and, more specifically, to on-page manipulation of underlying content and real-time content replacement.

BACKGROUND

Different testing schemes such as A/B, split, and multivariate testing, can be used on webpages to compare a baseline control webpage to a variety of webpage test samples. Based on the results of such testing, different content can be used to improve response rates for the webpages. This approach can be used to test tactics such as banner ads, emails, and landing pages. Different versions of a test webpage may be compared to a control sample webpage to identify elements that tend to produce better results. For example, different variations of the webpage may be distributed to users to determine which variables are most effective at increasing a response rate or other desired outcome. In order to be effective, the test webpages should reach enough users to detect meaningful differences between the different versions of the webpage.

Many companies, including Amazon®, Google®, and Microsoft® employ or provide multivariate testing tools that help in making marketing decisions. For example, Google® provides a website optimizer that allows users to upload different versions of a webpage to a server. Based on request attributes, search requests may be directed to specific versions of the webpage. Systems also exist that use overlays to manipulate some aspects of an underlying content. However, these systems use pure Hyper Text Markup Language (HTML) and are therefore limited on what features of the webpages can be manipulated.

DETAILED DESCRIPTION

A content management system may create different versions of content. By viewing statistics associated with the different versions, an operator can determine which versions attract more user traffic. The different versions of the webpage may provide substantially the same message but use different presentations. For example, one version may have a large header, a second version may have a slide show, and a third version may have an embedded video. In other examples, different versions of the webpage may comprise different colors, different sizes, and/or different content for text, images, icons, fields, etc., or the like, or any variations thereof.

An operator may enter a special key to access webpages on an associated website. An overlay may extend over the webpages providing the operator with a visual test setting. Once the overlay appears, the operator may select elements within the webpages for editing. The operator can use an HTML editor to alter the selected elements. In one example, the HTML editor may comprise a What You See Is What You Get (WYSIWYG) interface.

The content management system allows the operator to change the appearance of webpages viewed by users without changing the underlying content in the original webpages. This allows webpages to be changed on the fly and different versions of the webpages to be distributed to different groups of users based on selectable criteria. The content management system also may quantify the changes made to the webpages by gathering associated statistics and determining which versions of the webpages provide the best results. A user interface can present the test results in overlays as visualized analytic data.

Figure 1:
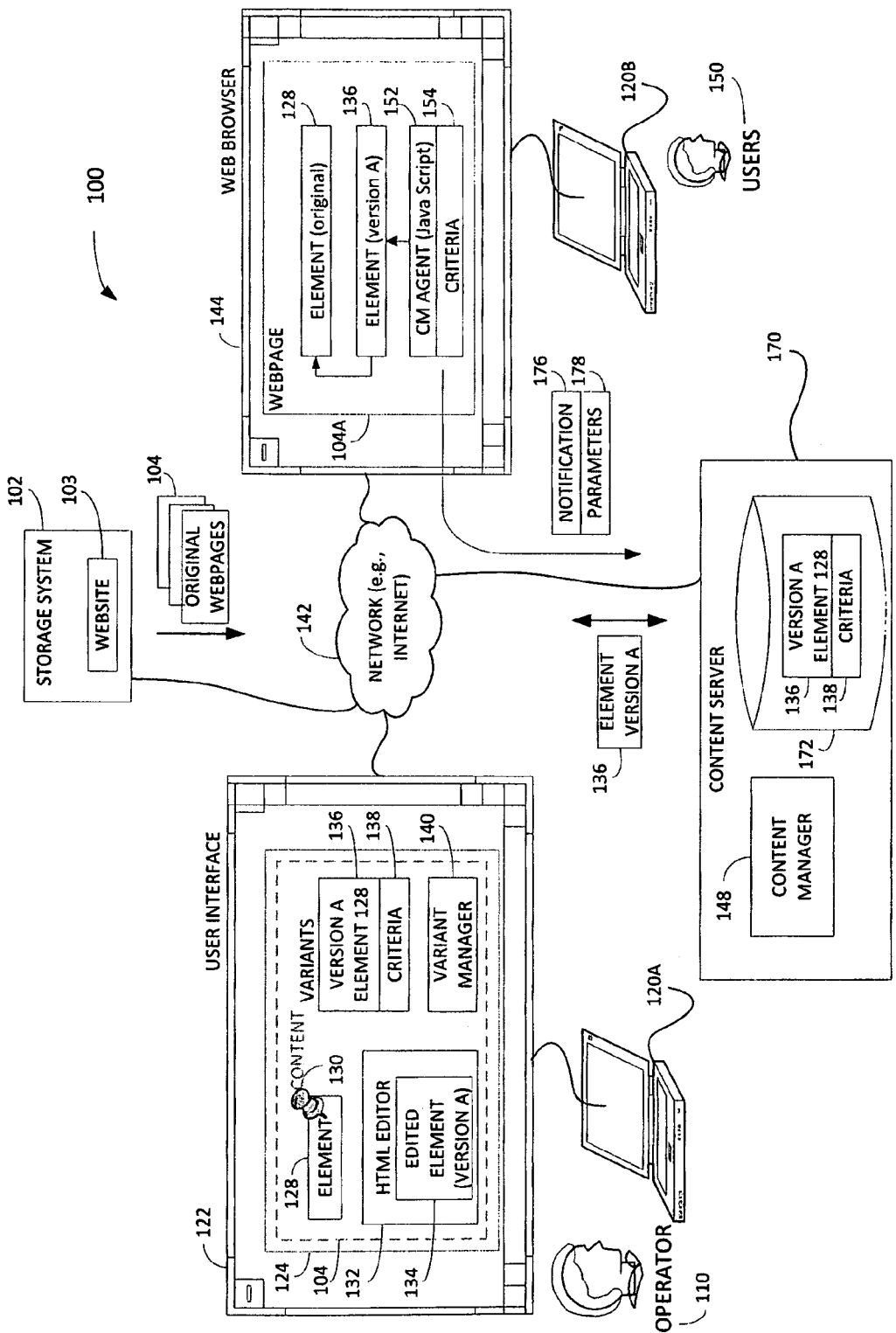
FIG. 1 depicts an example of a content management system.

FIG. 1 is a block diagram depicting a content management system 100 for manipulating content. A storage system 102 may store content. For example, storage system 102 may store webpages 104 for a website 103 operated by an enterprise. The enterprise may be a company that sells products on-line to users 150. Of course, the enterprise or operating storage system 102 and/or website 103 may be any service, business, company, individual, or other entity that provides information to users 150. Original webpages 104 may comprise a home webpage for website 103 and any additional webpages stored on storage system 102 associated with website 103.

A network 142 may connect storage system 102 to different computing devices 120. Network 142 may comprise any combination of local area networks (LANs), wide area networks (WANs), Internet Protocol (IP) networks, phone networks, Public Services Telephone Networks (PSTN), wireless networks, cellular networks, Wi-Fi networks, Bluetooth networks, cable networks, data buses, or the like, or any combination thereof used for transferring information between storage system 102 and computing devices 120.

Computing devices 120 may comprise any device that can access content on storage system 102. For example, computing devices 120 may comprise tablet computers, hand-held devices, smart telephones, mobile telephones, personal digital assistants (PDAs), laptop computers, personal computers, computer terminals, PSTN telephones, voice over internet protocol (VoIP) phones, or the like, or any combination thereof.

Some of computing devices 120A may be used by operators 110 of website 103 and some of computing devices 120B may be used by users 150 of website 103. For example, operators 110 may be persons employed by the enterprise to manage content in webpages 104. Users 150 may be customers or subscribers of the enterprise that operates website 103.

Users 150 may use computing devices 120B to access website 103. For example, one of users 150 may open a web browser 144 and send a Hypertext Transfer Protocol (HTTP) request over network 142 to website 103. Website 103 may send webpages 104 back to web browser 144 in response to the HTTP requests. Web browser 144 then may display the webpages 104 on a computer screen of computing device 120B.

Operator 110 may need to modify content on webpages 104. For example, operator 110 may want to modify content in webpages 104 to increase sales for products sold on webpages 104. In another example, operator 110 may want to redirect user activity to different webpages 104 on web site 103 or add new content for new products or services. The content management system 100 allows operator 110 to change the content displayed on webpages 104 and send test results for the changes back to operator 110.

A variant manager 140 may operate on computing device 120A, storage system 102, and/or on a content server 170. Variant manager 140 may open a user interface 122 on computing device 120A and download one of webpages 140 from storage system 102. Variant manager 140 also may display an overlay 124 over webpage 104. Overlay 124 may be transparent, semitransparent and/or opaque renderings and allows operator 110 to see and manipulate the underlying content contained within webpage 104.

User interface 122 may communicate with a code snippet embedded into webpage 130. This code snippet can interact with the webpage Data Object Model (DOM), add or extract elements to or from the source code of webpage 104, initialize webpage 104, and retrieve bootstrap scripts from content server 170. The bootstrap script, in turn, can load a library script, which provides broader functionality. Both the bootstrap script and library script can load overlay 124 and can be enabled remotely by a content manager 148 in content server 170. In another example, there may be no overlay 124 and operator 110 may access and modify elements in webpage 104B simply by accessing the webpage 104 through user interface 122.

Webpages 104 may contain one or more original elements 128. Elements 128 may comprise any information or control that may be contained and/or displayed within webpages 104. For example, elements 128 may comprise text, icons, images, links, fields, hypertext markup language (HTML) code, extensible markup language (XML) code, or the like, or any combination thereof.

As mentioned above, operator 110 may want to modify one or more elements 128 in an attempt to increase sales activity from webpage 104. For example, element 128 may comprise an icon that a user selects when purchasing an item. Operator 110 may want to change the color of the icon from green to red with the hope of causing more users to select the icon and purchase more associated items.

Operator 110 may select element 128 via overlay 124 causing variant manager 140 to display an HTML editor 132 within interface 122. HTML editor 132 may display the selected original element 128 within an edit window 134. In one example, HTML editor 132 may comprise a WYSIWYG interface that operates similar to a word processing application and allows operator 110 to edit element 128 within window 134. An edited version A of element 128 is stored and identified as variant 136 in user interface 122.

Operator 110 may make other changes to element 128 and save those other changes as other variants 136. For example, operator 110 may change the color of the icon associated with element 128 from green to red and save the red icon as version A variant 136. Operator 110 also may change the color of the icon associated with element 128 from green to blue and save the blue icon as a second version B variant 136.

In another example, operator 110 may modify other elements in webpage 104. For example, operator 110 also may change a font on text located in another location within webpage 104. Operator 110 may select the text for the second element 128 and the text may be displayed in HTML editor 132. Operator 110 may make the desired changes to the font of the text and save the changes as another variant 136. Operator 110 can make changes to any elements within webpage 104 and the changes may be saved by variant manager 140 as different variants 136. Variant manager 140 then may upload the variants 136 of webpage 104 to content server 170.

Operator 110 also may specify different criteria 138 for the variants 136. For example, operator 110 may create three different variants 136 for webpage 104 and may want to distribute the three different variants 136 evenly among users 150. Accordingly, operator 110 may designate a criteria 138 for a version A of element 126 to be displayed to 33% of users 150 accessing website 103. Operator 110 also may create criteria 138 for distributing each of the other two variants 136 to 33% of users 150. Criteria 138 are uploaded with the associated variants 136 to content server 170.

Content management system 100 then may perform real-time content replacement for testing the variants 136. Content management (CM) agents 152 may be embedded into original webpages 104 and may operate in conjunction with content manager 148. CM agents 152 and content manager 148 determine what variants 136 are displayed to users 150 within webpages 104. In one example, CM agent 152 may comprise Java script, Adobe Flash, or Microsoft Silverlight.

User 150 may download original webpage 104 from website 103 into web browser 144. Webpage 104 may be embedded with CM agent 152. CM agent 152 may send a notification 176 to content manager 148 identifying webpage 104. Notification 176 also may provide other parameters 178 needed by content manager 148 to determine what variants 136, if any, to send back to CM agent 152. For example, parameters 178 may provide additional information regarding user 150 and may be compared with criteria 138. In another example, CM agent 152 may compare parameters 178 with local criteria 154 to determine when to send notification 176 to content manager 148 and/or determine which variants 136 to display in webpage 104.

Based on the criteria 138, content manager 148 may send variants 136 back to CM agent 152. CM agent 152 then may dynamically replace original element 128 in webpage 104 with the variants 136 received from content manger 148. CM agent 152 may turn off the visibility of webpage 104 in web browser 144 until replacement HTML code in variant 136 is received from content server 170. CM agent 152 replaces HTML code for original element 128 with the HTML code for variant 136 and then turns the visibility of now modified webpage 104A back on in web browser 144.

For example, variant 136 may comprise the red icon created by operator 110 in user interface 122 and uploaded to content server 170. CM agent 152 replaces the green icon in original element 128 with the red icon in variant 136 and renders modified webpage 104A to user 150 in web browser 144. Thus, user 150 will see the red icon associated with variant 136 without operator 110 having to change original webpage 104 in website 103.

Different variants 136 may be used for the same webpage 104 based on criteria 154 and criteria 138. For example, operator 110 may have created a first variant 136 and a second variant 136 for element 128. As explained above, element 128 may be a green icon and the first variant 136 may comprise a red icon. The second variant 136 may comprise a green icon. Operator 110 may have created first criteria 138 for the first variant 136 specifying a first time period and created second criteria 138 for the second variant 136 specifying a second time period.

A user 150 may download webpage 104 from website 103. CM agent 152 may send notification 176 identifying webpage 104 to content manager 148. Content manager 148 may compare a current time of day with the times identified in the first and second criteria 138. Content manager 148 may send the first variant 136 with the red icon to CM agent 152 when the current time is within the first time period identified in first criteria 138. Content manager 148 may send the second variant 136 with the blue icon to CM agent 152 when the current time is within the second time period identified in second criteria 138.

CM agent 152 replaces original element 128 in original webpage 104 with variant 136 received from content manager 148 and displays modified webpage 104A. Thus, user 150 may see a red icon during the first time period and see a green icon during the second time period. Based on criteria 138, content manager 148 may only send the first and second variants 136 during the first and second time periods, respectively. During any other time period, content manager 148 may not send any variant 136 and original webpage 104 may be rendered in web browser 144 with original element 128.

Criteria 154 and/or 138 may specify any variety of conditions for using any combination of different variants 136. For example, criteria 154 and/or 138 may be based on, demographic, economic, psychographic, user interests, or the like, or any combination thereof. Other criteria 154 and/or 138 may be based on fixed times, fixed time periods, keywords in keyword searches entered by user 150, user grouping criteria, or randomly for each user 150.

For example, CM agent 152 may identify a source where user 150 accesses website 103, such as from a particular web browser, search engine, social network, etc. CM agent 152 may identify the source from HTTP requests sent from computing device 120B, an IP address, profile information for user 150, etc. The source may be sent to content manager 148 as parameters 178 with notification 176. Content manager 148 then may send different variants 136 back to CM agent 152 based on a comparison of the source in parameters 178 with criteria 138.

In another example, a third party service may aggregate demographic data for users 150 and associate the demographic data with a unique identifier, such as an IP address or email address. The third party service also may receive demographic data directly from users and/or may scrape demographic data from user profiles on social networks.

Content manager 148 may receive an IP address for user 150 as part of parameters 178 with notification 176. Content manager 148 may access the third party service and obtain demographic information associated with the user IP address, such as gender or household income. Criteria 138 may designate a first variant 136 for a male user 150 and may designate a second variant 136 for a female user 150. Criteria 138 also may designate different variants 136 based on any identified household income. Content manager 148 then sends variants 136 with matching criteria to CM agent 152.

Figure 2:
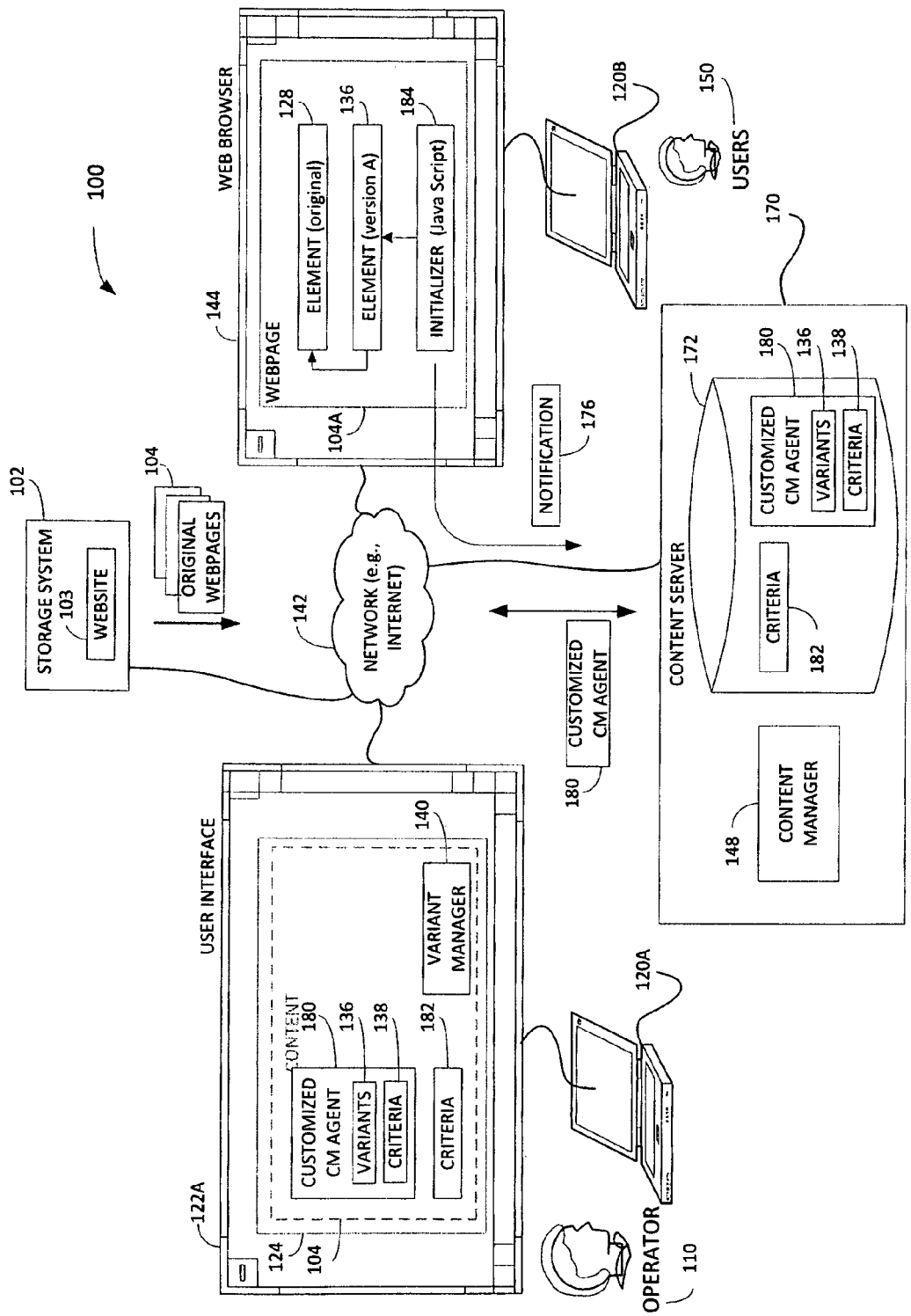
FIG. 2 depicts an example of a content management system generating customized content management agents.

FIG. 2 depicts a content management system that uses customized content management agents (CM agents). In one example, operator 110 may use user interface 122A to generate criteria 138 associated with variants 136. Variant manager 140 may generate a customized CM agent 180 for implementing variants 136 and criteria 138. For example, customized CM agent 180 may comprise Java code that identifies different user parameters, compares the parameters with criteria 138 and then replaces different elements 128 in original webpage 104 with variants 136 based on the comparisons.

Variant manager 140 may generate and upload customized CM agents 180 to content server 170. In another example, variant manager 140 may embed customized CM agents 180 in original webpages 104 and upload the webpages 104 to website 103. Variant manager 140 may generate additional criteria 182 that determine when customized CM agents 180 are uploaded to users 150. Criteria 182 may comprise any of the conditions described above for criteria 138 or may comprise other conditions, such as the amount of network traffic.

An initializer 184 comprising Java script may be embedded in original webpages 104. After webpage 104 is downloaded to browser 144, initializer 184 may send notification 176 to content manager 148. Notification 176 may identify webpage 104 and may identify any other parameters. In response to notification 176 and based on criteria 182, content manager 148 may upload customized CM agent 180 to web browser 144. After uploading into web browser 144, customized CM agent 180 may take over rendering and variant replacement operations as previously described for CM agent 152 in FIG. 1. In another example, a tag management service may be used for sending notification 176 to content manager 148 instead of embedding script in webpages 104.

Dynamically uploading customized CM agent 180 into web browser 144 allows more robust and customized rendering of variants 136 in webpages 104. For example, customized CM agent 180 may be programmed to replace a wider variety of elements 128 with a wider variety of variants 136 based on a wider variety of programmable criteria 138. Customized CM agents 180 may operate more autonomously on different computing devices 120B, thus requiring less communication with content server 170. This may result in better scaling and faster rendering of modified webpages 104A.

Figure 3:
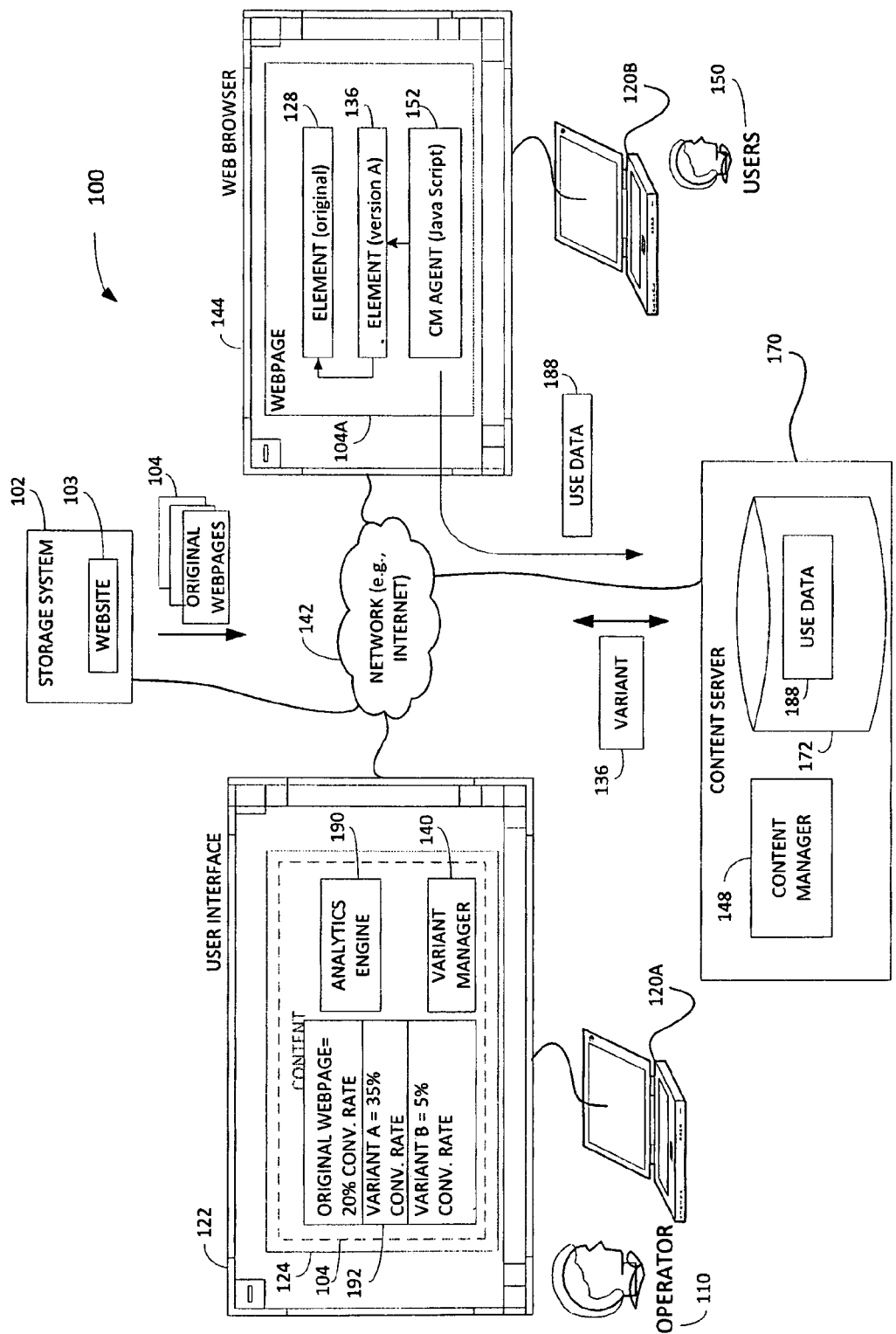
FIG. 3 depicts an example of a content management system providing analytics for content variants.

FIG. 3 depicts an example of a content management system 100 that provides analytics for webpages that use variants. User interface 122 may operate an analytics engine 190 directly on top of webpage 104 that views, changes, and reports on specific variants used in webpages 104. For example, analytics engine 190 may use overlay 124 as an interactive graphical tool for generating and displaying reports 192. The on-page analytics engine 190 may use Rich Internet Application (RIA) based, for example, on HTML 5, Adobe Flash or Microsoft Silverlight. In one example, analytics engine 190 may be implemented and operate as described in co-pending U.S. patent application Ser. No. 12/750,607, entitled: VISUALIZATION OF WEBSITE ANALYTICS, filed Mar. 30, 2010 which is incorporated by reference in its entirety.

CM agent 152 operating in web browser 144 may capture use data 188 associated with any versions of webpage 104. For example, a first original webpage 104 may be downloaded to a first web browser 144 during a first web session with a first user 150. CM agent 152 in the first web browser 144 may not replace original element 128 with variant 136 during the first web session. CM agent 152 may track use of original webpage 104 by the first user 150. For example, CM agent 152 may capture mouse clicks, opened original webpages 104, conversion rates, bounce rates, amount of time spent on website 103, etc. CM agent 152 may send the use data 188 to variant sever 170.

A second original webpage 104 may be downloaded to a second web browser 144 during a second web session with a second user 150. CM agent 152 in the second web browser 144 may replace original element 128 with variant 136 during the second web session. CM agent 152 then may track use of variant webpage 104A by the second user 150 and send the use data 188 to variant sever 170.

Analytics engine 190 then may conduct analytics on the use data 188 to determine relative popularities of the different variants for webpage 104. For example, analytics engine 190 may display in report 192 a conversion rate for original webpage 104 and a conversion rate for modified webpage 104A that used variant 136. Statistics can be overlaid over the versions of webpage 104 that were displayed to the user. For example, the statistics for original webpage 104 may be displayed in overlay 124 over original webpage 104 and statistics for modified webpage 104A may be displayed in overlay 124 over modified webpage 104A.

Analytics engine 190 may be utilized as a proxy for the communication between overlay 124 and the underlying webpage 104. Analytics engine 190 may manage the rendering and display of the underlying webpages 104 and 104A and provide a plurality of automatic actions, which may trigger additional real-time content replacement based on other predefined criteria. Example applications of such real-time content replacement may include A/B testing, uptime monitoring, email management, and so forth. In one example, dynamic A/B testing may be performed by substituting elements on any webpage 104 of the website 103 according to preconfigured settings, which can be defined by operator 110 via the analytics engine 190.

The use data 188 captured by CM agent 152 may be dynamically changed based on different programmable criteria. For example, operator 110 may generate testing criteria when creating variant 136. The testing criteria may be uploaded to content server 170 along with variant 136. CM agent 152 may send a notification back to content manager 148 when webpage 104 is initially downloaded into web browser 144. Content manager 148 may send the testing criteria along with variant 136 back to CM agent 152 in response to the notification. CM agent 152 then may capture different data during the web session based on the testing criteria.

Figure 4:
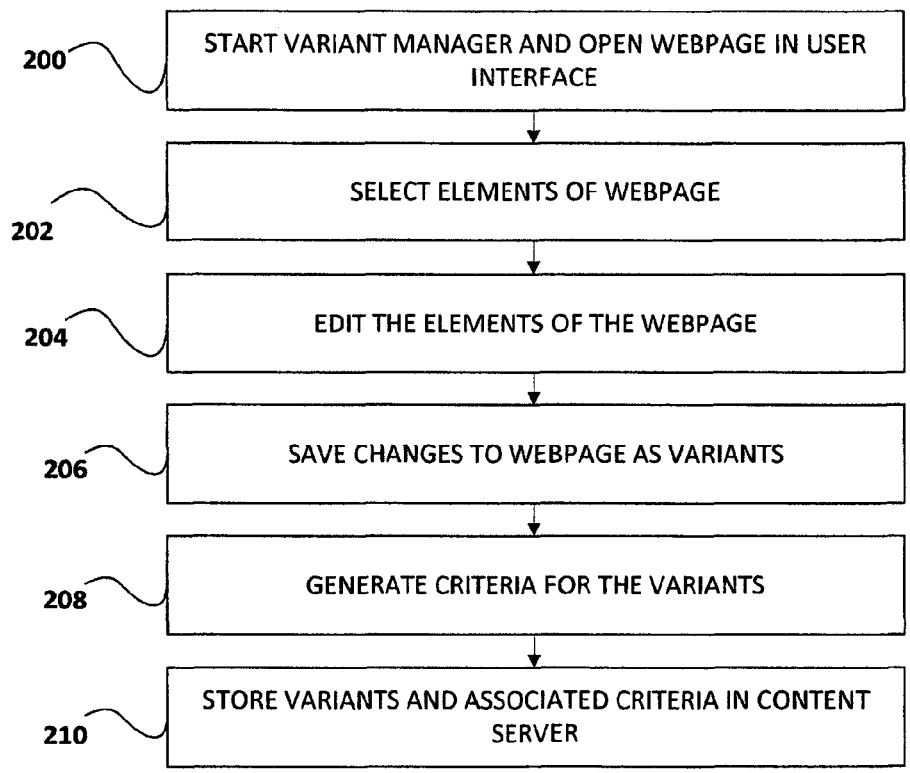
FIG. 4 depicts an example of a process for generating variants for webpages.

FIG. 4 depicts an example of a process for generating variants for webpages. In operation 200, an operator starts a variant manager and downloads a webpage from a website in a user interface. In one example, the variant manager may access HTML code in the webpage through an embedded snippet. In operation 202, the operator may select an element within the webpage via the user interface. For example, the user interface may display an overlay over the webpage and the operator may move a cursor over the overlay and over an element in the webpage and click on the element.

In operation 204, the operator may edit the selected element. For example, a HTML editor may display the selected element and the operator may change a size, shape, content, location, etc. of the element, or completely replace, or remove the element. In operation 206, the changes to the webpage may be saved as variants. For example, different elements, and/or different combinations of elements, may be changed in multiple different ways. The different combinations of the changes may be saved in different files as different variants. Each different file may be assigned a different name identifying the associated changes.

In operation 208, the operator may generate different criteria for the variants. For example, the operator may create criteria that only send the variant to users in Europe. In operation 210, the variants and associated criteria are stored in the content server. The content server then supplies the variants to web browsers based on the associated criteria. For example, the content server may send the variant in response to notifications received from a content management agent embedded in the webpage indicating the webpage has been downloaded to a web browser and that the user has an associated European IP address.

Figure 5:
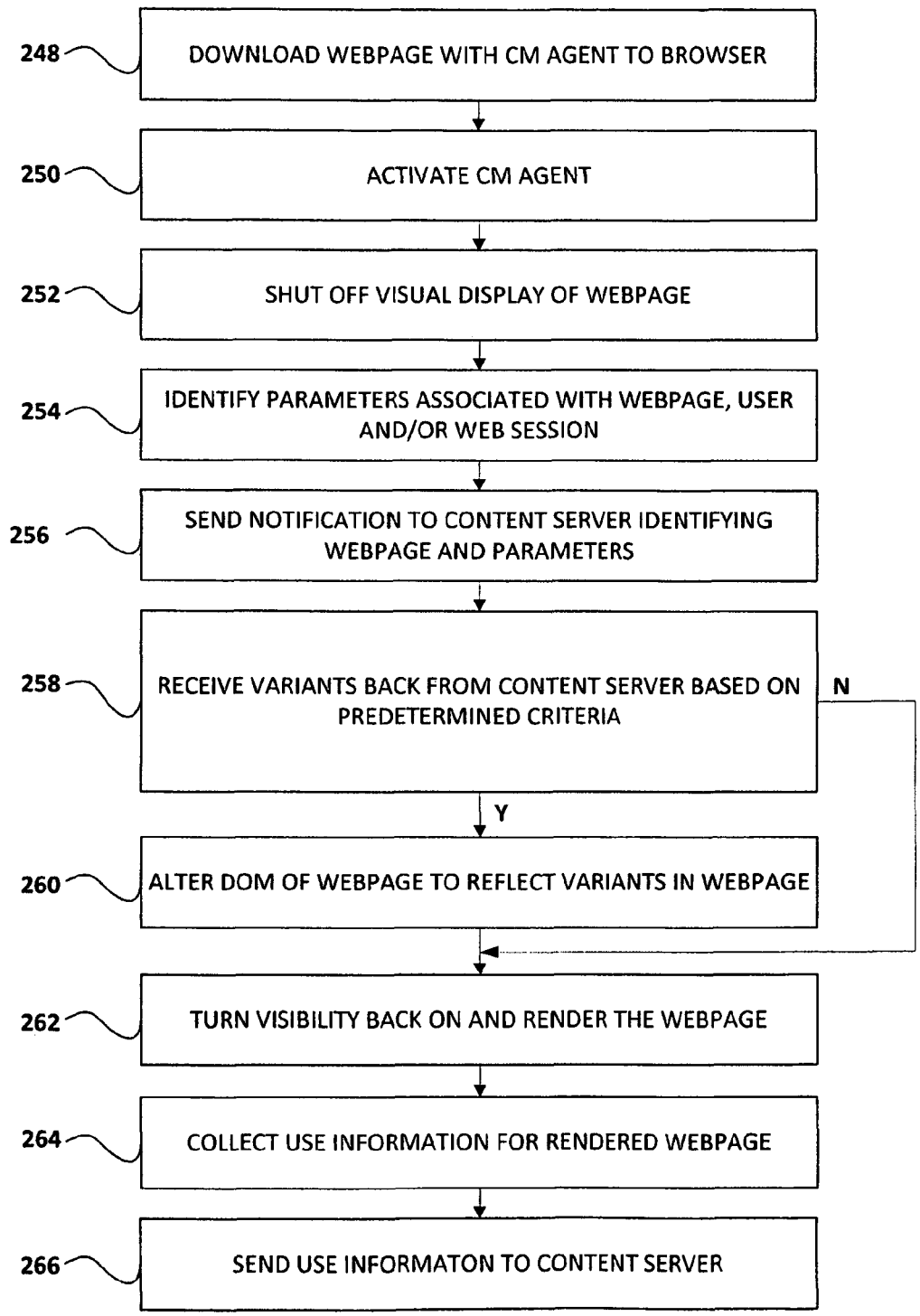
FIG. 5 depicts an example of a process for real-time alteration of webpages.

FIG. 5 depicts an example of a process for real-time replacement of webpage elements with variants. In operation 248, an original webpage is downloaded from a website to a web browser. For example, a user may perform a search via a search engine and select an identified link to the website. The webpage downloaded to the web browser may include JavaScript code that operates as a content management (CM) agent.

In operation 250, the CM agent is activated. For example, the CM agent may start operating on the web browser before the webpage is rendered and displayed on the web browser. In operation 252, the CM agent may temporarily shut off the visual display of the webpage. For example, the Java script in the CM agent may modify a visibility setting in the webpage HTML, such as in a cascading style sheet (CSS) property.

In operation 254, the CM agent may identify parameters that may determine what variants, if any, are used with the downloaded webpage. The parameters may be associated with the webpage, the user, and/or the web session. For example, the CM agent may locate a webpage identifier in the downloaded webpage and also may identify other parameters such as an email address or demographic information for the user, or an originating portal where the user initiated the web session.

In operation 256, the CM agent may send a notification to the content server including the webpage identifier and any other parameters as described above. In operation 258, the content server may send variants back to the CM agent based on associated criteria. For example, the content server may send a particular variant, or particular set of variants, to users with a particular demographic identified in the parameters.

In operation 260, the CM agent alters the document object model (DOM) for the webpage to display the variants received back from the content server. If no variants are received back from the content server, the CM agent may not alter the original DOM for the webpage. In operation 262, the CM agent turns the visibility back on for the webpage in the web browser and the webpage is rendered and displayed to the user. The rendered webpage may now contain variants that are downloaded in real-time from the content server based on operator configured criteria.

In operation 264, the CM agent may collect use information for the rendered webpage. For example, the CM agent may detect and collect user cursor movements and mouse clicks within individual webpages and user movements between webpages from the website. In operation 266, the collected use data is sent back to the content server. The content server and an analytics engine may perform different analytics for the different webpage variants. For example, the analytics engine may derive conversion rates, time on website, locations of mouse clicks, heat maps, bounce rates, etc., for the original webpage and for each variant used with the webpage. The analytics engine may display the results to the operator as overlays over the associated original webpage and the modified webpages displaying the variants.

Figure 6:
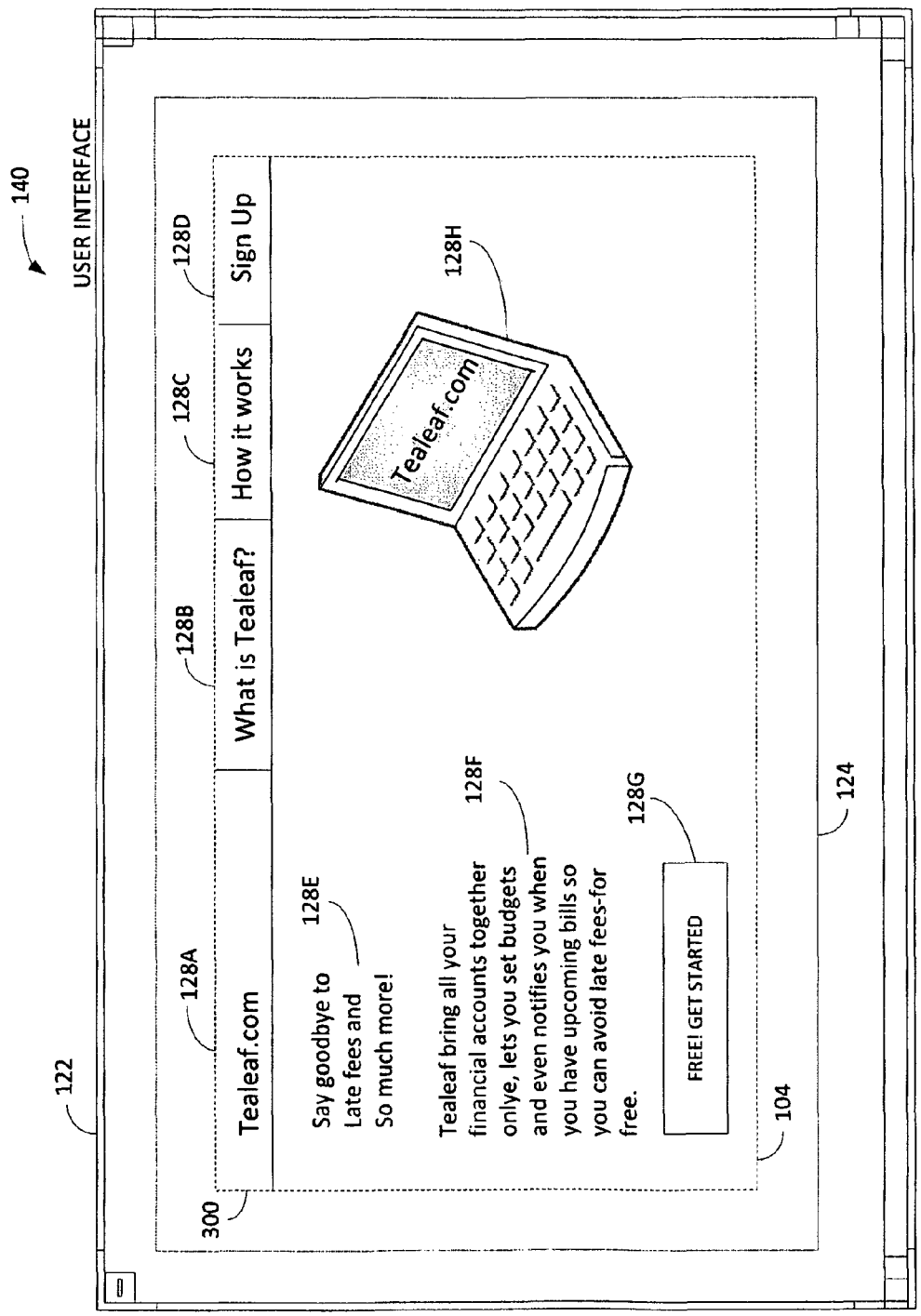
FIG. 6 depicts a user interface for a webpage editor.

FIG. 6 depicts an example of a user interface 122 for manipulating content in a webpage 104. User interface 122 may be displayed on a computer screen of a computing device 120A as previously shown in FIG. 1. In one example, user interface 122 may displayed through a web browser after an operator logs into an associated website using an authorized user name and password. In another example, user interface 122 may be displayed via an application operating on a mobile device. User interface 122 also may display a semi-transparent overlay 124 over webpage 104.

Webpage 104 may contain multiple different elements 128A-128H. For example, a tool bar 300 in webpage 104 may contain an element 128A comprising text that identifies an Internet domain name for the website. An element 128E may comprise text for a link to another webpage containing additional information regarding the website. An element 128C may comprise text for a link to another webpage containing additional information regarding the website. An element 128D may comprise text for a link to another webpage for signing up to the website.

A main body of webpage 104 may include an element 128E comprising a first block of text and an element 128F comprising a second block of text. An element 128G may comprise an icon and text that when selected may link to yet another webpage for the website. An element 128H may comprise an image that may represent additional information related to the website. Elements 128 are just examples and any content contained in a webpage may comprise elements 128.

A variant manager 140 operating on a computing device displays user interface 122 on a screen of the computing device. An overlay 124 is displayed over webpage 104 and allows the operator to select and change elements 128 within webpage 104. Variant manager 140 then saves the changes as variants for later displaying to users of the website.

Figure 7:
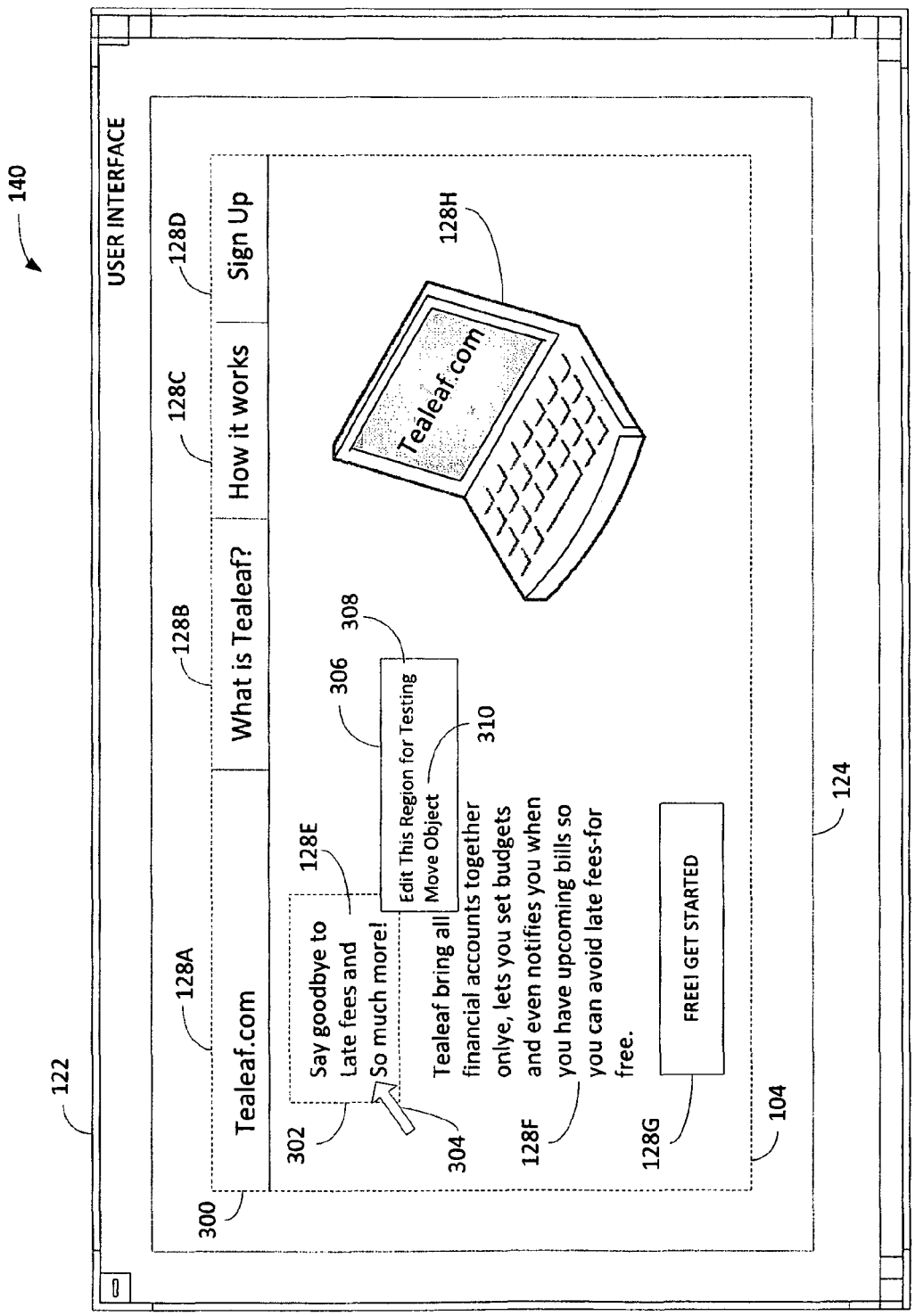
FIG. 7 depicts a user interface for identifying elements on a webpage for editing.

FIG. 7 depicts an example of a user interface configured to select elements on a webpage. The operator may select one of elements 128 within webpage 104. For example, the operator may use a computer mouse to move a cursor 304 over element 128E. Variant manager 140 may automatically highlight element 128E. For example, variant manager 140 may identify HTML code within webpage 104 that displays the text in selected element 128E and display a box 302 around the identified text.

The operator may select element 128E by moving cursor 304 over the text of element 128E and then pressing a left mouse button or by entering a combination of keystrokes. Selecting element 128E may cause variant manager 140 to display a panel 306. Selecting a first item 308 in panel 306 may cause variant manager 140 to open a HTML editor for modifying element 128E. Selecting a second item 310 in panel 306 may cause variant manager 140 to allow the operator to move element 128E to another location within webpage 104. For example, selecting item 310 may cause variant manager 140 to drag and drop element 128E to a new location of cursor 304.

Figure 8:
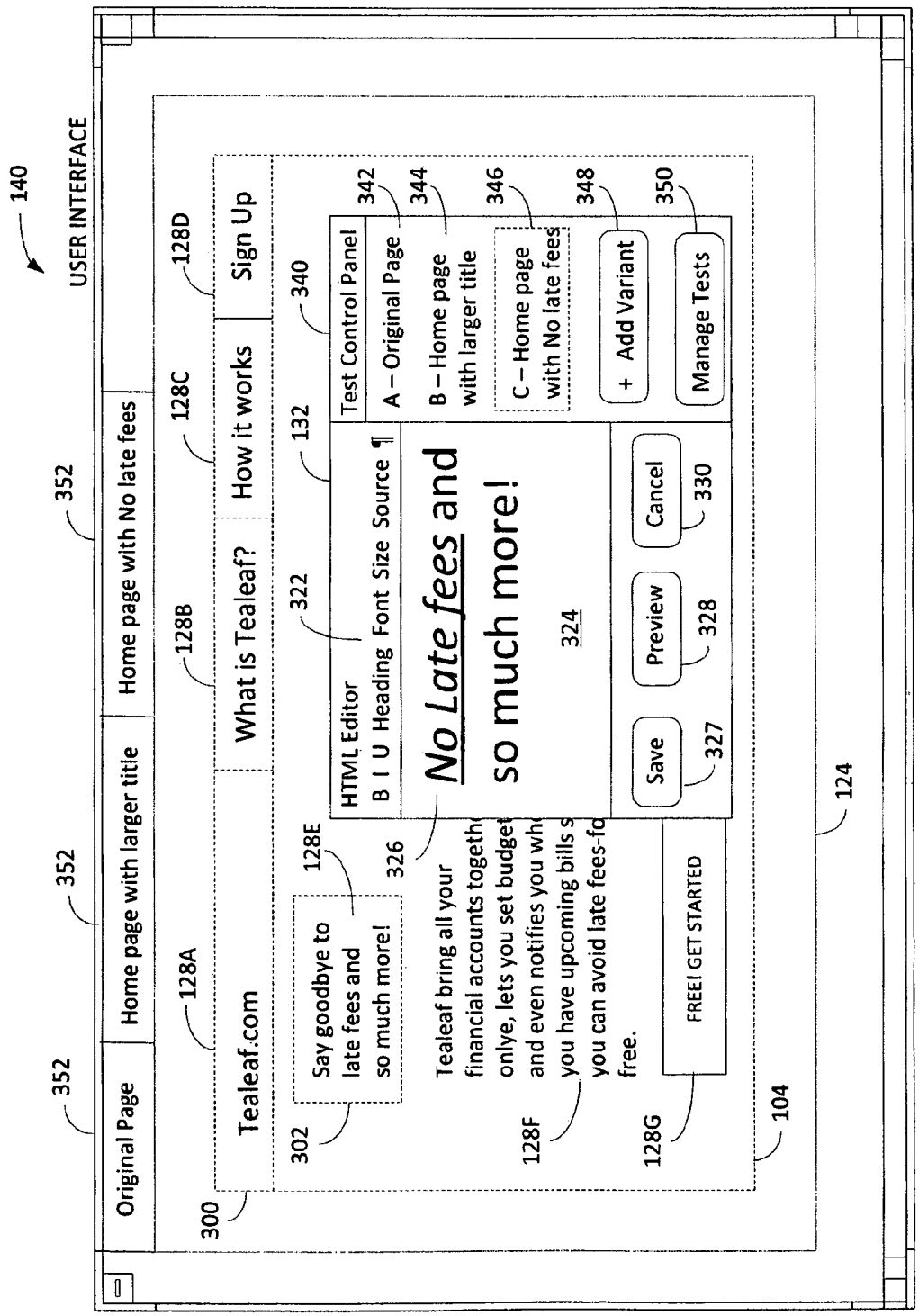
FIG. 8 depicts a user interface for editing elements on a webpage.

FIG. 8 depicts an example of a HTML editor 132 for editing elements within a webpage. Variant manager 140 may display HTML editor 132 in response to selection of item 308 in FIG. 7. HTML editor 132 may initially display original selected element 128E within an edit box 324 and may display a tool bar 322 for changing the format and content of element 128E. Thus, the operator may edit element 128E in a same manner as using a conventional word processing application. In this example, the operator changes the original text of element 128E from "Say goodbye to late fees and so much more!" to "No Late fees and so much more!" in a modified element 326.

The operator may save the modified element 326 as a variant 346 by selecting a save icon 327. The operator may preview webpage 104 with the modified element 326 by selecting a preview icon 328. For example, selecting preview icon 328 may display webpage 104 with original text element 128E replaced with modified text element 326. Selecting a cancel icon 330 may delete modified text element 326 and close HTML editor 132.

Variant manager 140 also may display a test control panel 340 in response to selection of element 128E and/or in response to selection of save icon 327. Test control panel 340 may identify different variants created for webpage 104. For example, a first variant 342 in control panel 340 may comprise the original webpage 104 received from the website. In one example, original webpage 104 cannot be edited or removed with editor 132. A second variant 344 may comprise a first change made to webpage 104. For example, variant 344 may have created a larger title for webpage 104. A third variant 346 may comprise a second change made to webpage 104. For example, variant 346 may comprise modified text element 326 created in HTML editor 132.

Selection of an icon 348 may create a file for another variant of webpage 104. For example, the operator may select another element 128, change the selected element 128 in HTML editor 132, and save the changed element as the new variant created in text control panel 340. A manage tests icon 350 may be selected to control how and when variants 342, 344, and 346 are presented to users and how test results are analyzed and displayed back to the operator. For example, selecting icon 350 may open a window for creating criteria that determine when variants 342-346 are displayed to users and determine what test data to capture while the variants are being displayed to the users.

Figure 9:
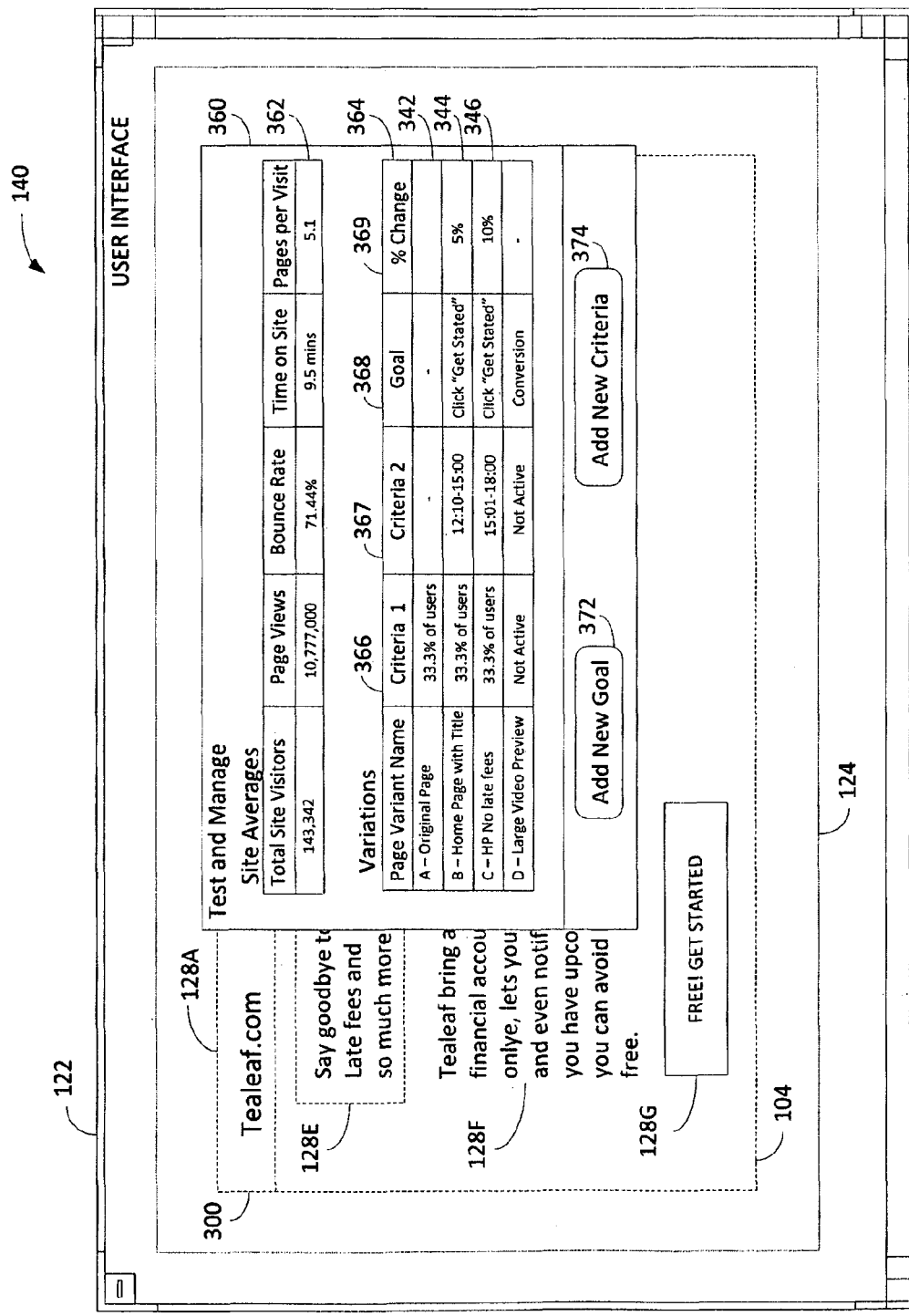
FIG. 9 depicts a user interface for generating criteria for displaying different variants on a webpage.

FIG. 9 depicts an example of a text management panel 360 for controlling variant tests. A section 362 may display different averages for the website. For example, section 362 may identify a total number of visitors to the website over some period of time, an average number of webpages viewed over the time period, an average bounce rate, an average time each user spent on the website, and an average number of webpages visited by the users. Of course, any other test data can also be displayed.

Section 364 may contain fields for setting criteria for the different variants 342-346. For example, the operator may enter values into fields of a criteria column 366 that determine how variants 342-346 are displayed to users. For example, the operator may enter values of 33% into the fields of column 366 associated with variants 342, 344, and 346. Variant manager 140 then may assign criteria to each of the variants that cause the content server to distribute each of variants 342-346 to 33% of the users accessing the website.

Other criteria can also be created. For example, the operator may enter time values into fields of a second criteria column 367. Variant manager 140 then may assign criteria to each of variants 342-346 that cause the content server to use variants 342-346 during associated time periods specified in criteria column 367. For example, variant 344 may be used between 12:10-3:00 pm, variant 346 may be used between 3:01-6:00 pm, and original page variant 342 may be used during all other time periods.

The operator may enter values into fields of a goal column 368 to specify specific user actions/goals for monitoring while variants 342-346 are being displayed. For example, one goal may be to increase the number of mouse clicks to the icon element 128G in webpage 104. The operator may select the icon element 128G and then select the field for one of variants 342-346 in column 368 to link to icon element 128G.

Variant manager 140 may generate Java code that the CM agent uses to track clicks on icon element 128G. The CM agent already may track the mouse clicks for icon element 128G. Variant manger 140 then may only need to send a message to the content server or to an analytic engine to aggregate the mouse clicks on icon element 128G for each of selected variants 342-346.

The number or percentage of mouse clicks on icon element 128G may be calculated and displayed in column 369 for each of variants 342-346. For example, a number of mouse clicks on icon element 128G may be tracked while original page variant 342 is displayed to users. The number of mouse clicks on icon element 128G also may be tracked while variants 344 and 346 are displayed to users. The analytics engine then may compare the number of mouse clicks for each of the variants 342-346. For example, a percentage increase or decrease in the number of mouse clicks for variants 344 and 346 may be compared with the number of mouse clicks on original webpage 104 in column 369. A icon 372 may be selected to add new goals for the variants and a icon 374 may be selected to add new criteria for the variants.

Figure 10:
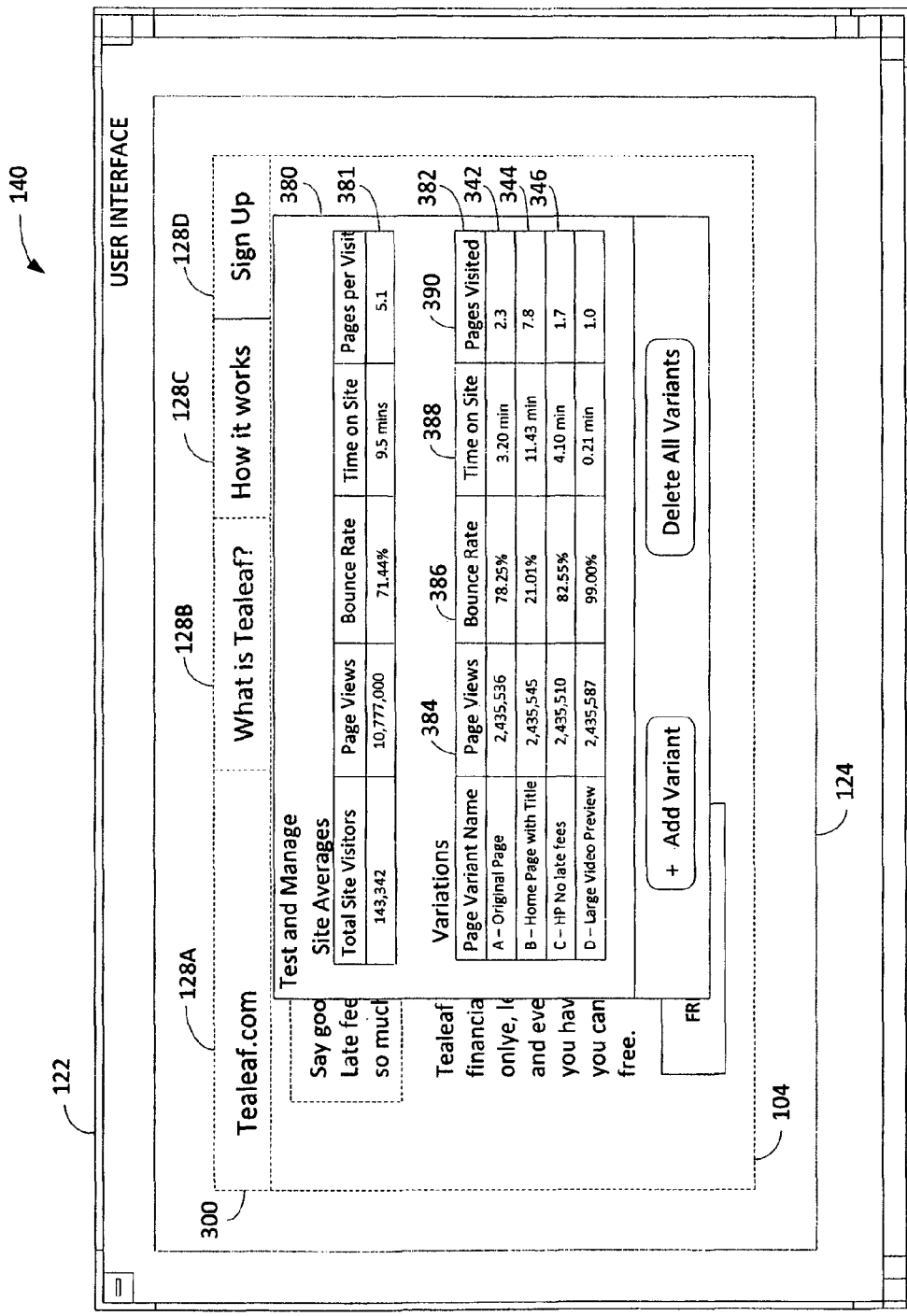
FIG. 10 depicts a user interface for displaying analytics for different variants displayed on a webpage.

FIG. 10 depicts an example of a panel 380 showing tests results for different variants. The data shown in panel 380 may be captured by CM agents and sent to content server 170 in FIG. 1 for further analytic analysis. A section 381 may display averages for user visits to the website as described above in FIG. 9. For example, section 381 may identify a total number of visitors to the website over some period of time, the number of webpages viewed by the users, a bounce rate, an average time each user spent on the website, and an average number of webpages opened by the users per website visit.

Section 382 may identify results for each the different variants 342-346. For example, column 384 may show the number of times the original webpage 104 associated with variant 342 was viewed. Column 384 also may show the total number times the modified webpages with variants 344 and 346 were viewed. A column 386 shows a bounce rate indicating a percentage of users who enter the associated webpage and leave the website rather than continue viewing other webpages within the same website. For example, original webpage 104 associated with variant 342 has a bounce rate of 78.25% and modified webpage with variant 344 has a bounce rate of 21.01%.

Column 388 indicates the average amount of time spent on the website by users for each of variants 342-346. For example, users spent on average of 3.20 minutes on the website when original page 104 is displayed. Users on average spent 11.43 minutes on the website when variant 344 was displayed on the modified webpage.

Column 390 indicates the average number of pages downloaded per user visit for each of variants 342-346. For example, users downloaded on average 2.3 webpages from the website when original webpage 104 was displayed. Users downloaded on average 7.8 webpages from the website when variant 344 was displayed. Thus, in this example, it appears that variant 344 may cause users to spend more time on the website and view more pages while on the website.

Figure 11:
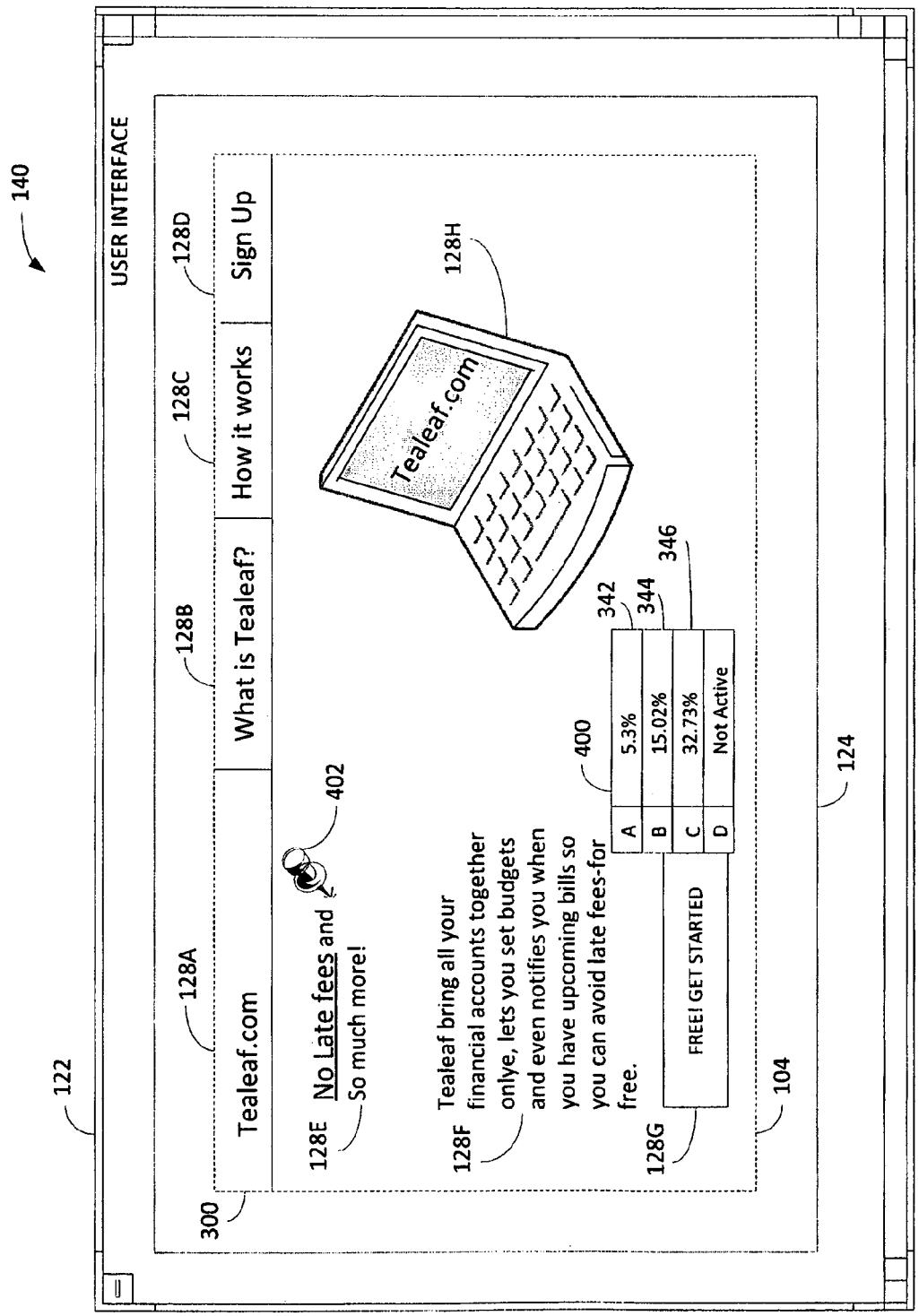
FIG. 11 depicts a user interface for identifying performance results for different variants.

FIG. 11 depicts an example of a user interface displaying locations of variants in a webpage. A push pin 402 is displayed next to element 128E indicating that the original content of element 128E has been changed to the content currently displayed within modified webpage 104. The operator may delete the variant for element 128E by selecting pushpin 402 and entering a delete command.

A performance table 400 is displayed in user interface 122 next to icon element 128G. Performance table 400 may identify a percentage of mouse clicks on icon element 128G for each of variants 342-346. For example, the data captured by the CM agent indicates that icon element 128G is selected 5.3% of the time when the original webpage 104 associated with variant 342 is displayed. The data also indicates that icon element 128G is selected 15.02% of the time when variant 344 is displayed on modified webpage 104 and icon 128G is selected 32.73% of the time when variant 346 is displayed on webpage 104. Thus, it appears that using variant 346 is likely to increase the number of mouse clicks on element 128G.

Figure 12:
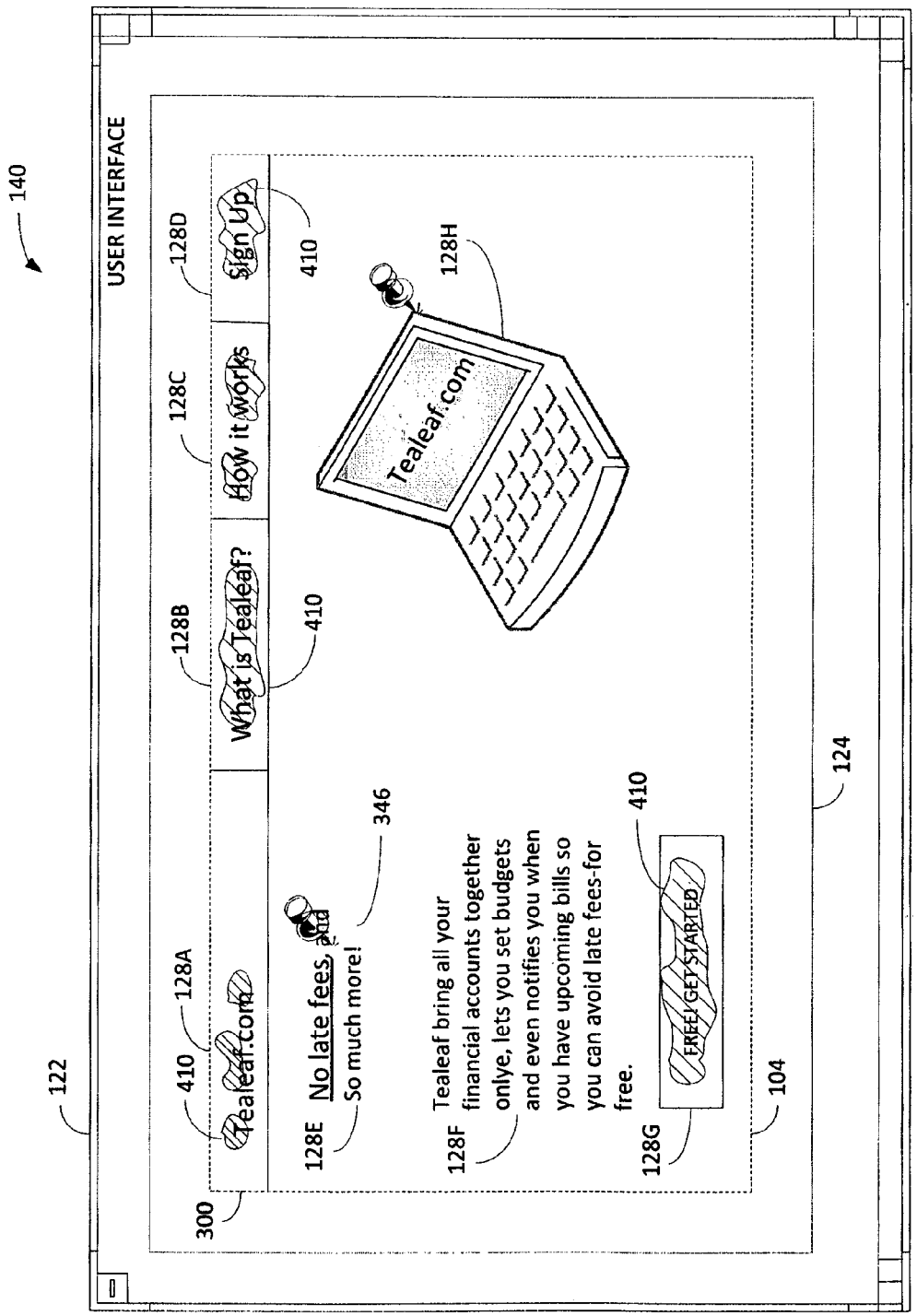
FIG. 12 depicts a user interface displaying a usage map for variants of a webpage.

FIG. 12 depicts an example of a user interface configured to display heat maps for different variants of webpage 104. In this example, the heat map is displayed in overlay 124 over modified webpage 104 displaying variant 346 of element 128E. Shaded areas 410 represent places on webpage 104 where a user performed a mouse click. In one example, shaded areas 410 are darker when more mouse clicks are detected in the same area. Heat maps can be displayed for each variant indicating how the variants influence user behavior on webpage 104.

Figure 13:
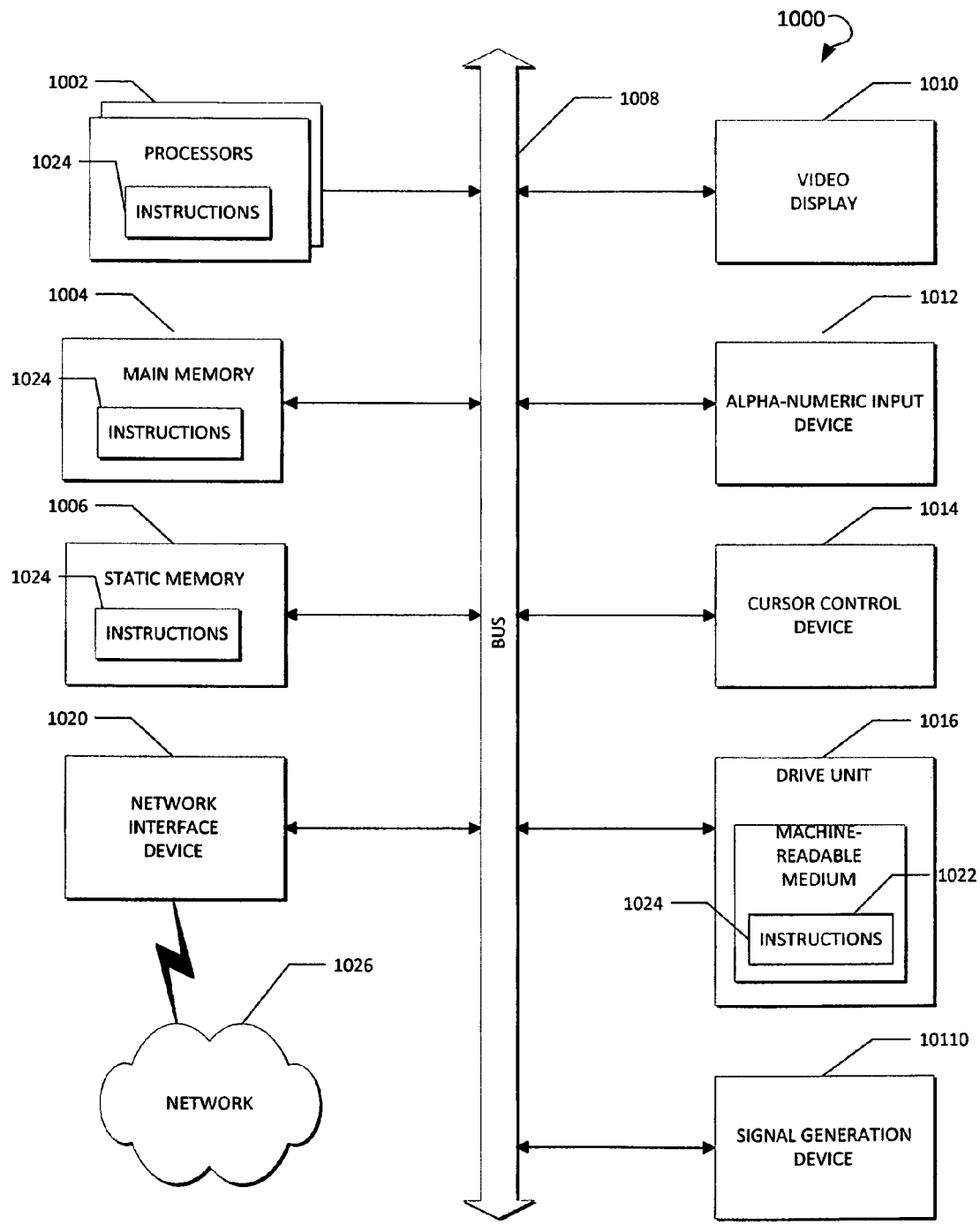
FIG. 13 depicts a computing device for implementing a content management system.

FIG. 13 shows a diagrammatic representation of a computing device for a machine in the example electronic form of a computer system 1000, within which a set of instructions cause the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes an engine or multiple engines 1002 (e.g., a central processing unit (CPU), a graphics processing unit (GPU), or both), and a main memory 1004 and a static memory 1006, which communicate with each other via a bus 1008. The computer system 1000 can further include a video display unit 1010 (e.g., a liquid crystal displays (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a computer-readable medium 1022 on which is stored one or more sets of instructions and data structures (e.g., instructions 1024) embodying or utilized by any one or more of the methodologies or functions described herein. The instructions 1024 can also reside, completely or at least partially, within the main memory 1004 and/or within the engines 1002 during execution thereof by the computer system 1000. The main memory 1004 and the engines 1002 also constitute machine-readable media.

The instructions 1024 can further be transmitted or received over a network 1026 via the network interface device 1020 utilizing any one of a number of well-known transfer protocols (e.g., Hyper Text Transfer Protocol (HTTP), CAN, Serial, Modbus).

While the computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, systems and methods for page setup and real-time content replacement in A/B testing have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Having described and illustrated the principles of various examples, it should be apparent that the examples may be modified in arrangement and detail without departing from such principles. Claim is made to all modifications and variations coming within the spirit and scope of the following claims.

The invention claimed is:

1. A method, comprising:
receiving, by a computing device, a content management (CM) agent in a web page served from a web application operating from a website on a storage system;
intercepting, by the CM agent, a request to render original content in the web page by a client application operating on the computing device;
detecting, by the CM agent, the original content as the web page is being served from the web application;
shutting off, by the CM agent, a visual display of the web page;
sending, by the CM agent, a notification to a content server identifying the web page;
receiving, by the CM agent, replacement content from the content server, wherein the replacement content comprises an alternative version of an element in the original content in the web page and predetermined criteria associated the alternative version of the element;
dynamically replacing, by the CM agent, the original content in the web page with the replacement content based on the predetermined criteria;
turning on, by the CM agent, the visual display of the web page after replacing the original content with the replacement content; and
rendering, by the computing device, the replacement content with the web page via the client application, wherein a variant manager operating independently and remotely from the client application and the web application generates the alternative version of the element and the predetermined criteria based on the original content in the web page.

2. The method of claim 1, wherein the replacement content is created by the variant manager using a graphical interface overlaying the original content in the web page, wherein the graphical interface is configured to:
download the web page from the web application prior to the web application serving the web page to the client application operating on the computing device;
directly select the element in the original content in the web page;
create the alternative version of the element;
generate the predetermined criteria and associate the predetermined criteria with the alternative version of the element; and save the predetermined criteria and the alternative version of the element as part of the replacement content on the content server.

3. The computer-implemented method of claim 1, wherein the replacement content is created within a Hyper Text Markup Language (HTML) editor, image editor, or media editor.

4. The method of claim 1, further comprising generating, by the computing device, use statistics using the original content and the replacement content.

5. The method of claim 1, further comprising receiving, by the computing device, various versions of the replacement content from the content server based on the predetermined criteria and a user of the computing device.

6. The method of claim 1, further comprising receiving, by the computing device, various versions of the replacement content from the content server based on the predetermined criteria and a geographical location of a user of the computing device.

7. The method of claim 1, further comprising receiving, by the computing device, various versions of the replacement content based on the predetermined criteria and gender, income, or interests of a user of the computing device.

8. A system, comprising:
logic circuitry configured to:
download a first copy of a web page from a web application operating on a storage system;
create replacement content for original content in the first copy of the web page, wherein the replacement content differs from the original content in one or more alternative elements;
generate predetermined criteria that determines when the replacement content should replace the original content;
store the replacement content and the predetermined criteria on a content server that operates independently of the storage system;
receive a notification and parameters from a user device, wherein the user device has downloaded a second copy of the web page from the web application and the second copy of the web page contains a content management (CM) agent configured to send the notification and parameters;
send the replacement content to the CM agent based on a comparison of the parameters with the predetermined criteria, wherein the replacement content is configured to dynamically replace original content in the second copy of the web page, and wherein the logic circuitry is further configured to:
download the first copy of the web page from the web application prior to the web application serving the second copy of the web page to the user device,
select an element in the first copy of the web page,
create an alternative version of the element for replacing the element in the first copy of the web page,
associate the predetermined criteria with the alternative version of the element, and
save the predetermined criteria and the alternative version of the element as part of the replacement content.

9. The system of claim 8, wherein the logic circuitry is further configured to overlay a graphical interface over the original content in the first copy of the web page, wherein the graphical interface is configured to create and save the alternative version of the element as the replacement content.

10. The system of claim 9, wherein the predetermined criteria determines how the replacement content is distributed to users.

11. The system of claim 10, wherein the logic circuitry is configured to distribute various versions of the replacement content based on geographical location of the users.

12. The system of claim 9, wherein the logic circuitry is configured to enable distribution of various versions of the replacement content based on gender, income, or interests of users.

13. The system of claim 8, wherein the CM agent is further configured to render statistics related to use of the original content and use of the replacement content.

14. A non-transitory storage medium comprising instructions, which when executed by a content server, perform the following operations:
receiving, by the content server, different versions of web page content from a variant manager;
receiving, by the content server, predetermined criteria from the variant manager, wherein the predetermined criteria determines which of the different versions of the web page content to replace a first version of the web page content;
storing, by the content server, the different versions of the web page content;
receiving, by the content server, a notification from a content management (CM) agent operating on a client device, wherein the client device is located remotely from the content server and the notification identifies a web page containing the first version of the web page content;
based on the predetermined criteria, identifying a second version of the web page content from the different versions of the web page content stored on the content server; and
sending, by the content server, the second version of the web page content to the CM agent for replacing the first version of the web page content in the web page, wherein the variant manager is configured to:
download the first version of the web page content from a web application prior to the web application serving the first version of the web page content to the client device,
select an element in the first version of the web page content,
create an alternative version of the element in the first version of the web page content,
associate the predetermined criteria with the alternative version of the element, and
save the predetermined criteria and the alternative version of the element as part of the second version of the web page content.

15. The non-transitory storage medium of claim 14 wherein the operations further comprise:
receiving use data from the client device related to the first version and the second version of the web page content; and
sending the different versions of the web page content to other client devices based on the use data.

16. The non-transitory storage medium of claim 14, wherein the operations further comprise:
receiving user parameters with the notification;
comparing the user parameters with the predetermined criteria; and
selecting the second version for the web page content from the different versions of the web page content based on the comparing of the user parameters with the predetermined criteria.

* * * * *